United States Patent [19]

Fraiberg

[11] 4,408,927

[45] Oct. 11, 1983

[54] THREADED JOINT TOGGLE-LOCKED WITH A HELICAL SPRING

[75] Inventor: Igor Fraiberg, Fort Worth, Tex.

[73] Assignee: Gearhart Industries, Inc., Fort Worth, Tex.

[21] Appl. No.: 293,517

[22] Filed: Aug. 17, 1981

[51] Int. Cl.³ .......................... B25G 3/00; F16D 1/00; F16G 11/00

[52] U.S. Cl. .................................... 403/320; 285/92; 411/148; 411/134

[58] Field of Search ................... 403/320; 285/92, 89, 285/318; 411/148, 149, 134, 132

[56] References Cited

U.S. PATENT DOCUMENTS 2,129,704  9/1938  Meyer ........................... 285/318 X
3,390,900  7/1968  McCormick et al. ............ 285/89 X
3,880,451  4/1975  Kinzbach ............................ 285/92
4,165,194  8/1979  Flower ................................ 403/320

Primary Examiner—Wayne L. Shedd
Attorney, Agent, or Firm—Head, Johnson & Stevenson

[57] ABSTRACT

A resilient holding device comprising a looped helical spring or a closed loop of interconnected essentially circular disc elements confined to an annular cavity circumferentially within a threaded joint or coupling. By tightening the threaded joint or coupling such as to engage the confined spring, a latching effect is created that requires a reverse torque for disassembly that exceeds the torque required to tighten. Such a torque biased threaded coupling is particularly useful in oil field applications.

6 Claims, 6 Drawing Figures

THREADED JOINT TOGGLE-LOCKED WITH A HELICAL SPRING

BACKGROUND OF THE INVENTION

1. Field of the Invention

This invention relates to a method and apparatus for locking a threaded joint. More specifically, the invention relates to a resilient holding device for a threaded joint or coupling that, for purposes of disassembly, requires the application of a torque that is in excess of the torque required to assemble or tighten the joint or coupling.

2. Description of the Prior Art

Various methods and apparatus have been proposed and used in the past to temporarily lock a threaded joint or coupling in place. Thus, it is known that to secure, for example, a nut on a bolt, several types of devices can be employed such as a pair of nuts under tension, a Castle nut and cotter pin, a split nut and closing screw, various types of lock washers and lock nuts or even selected chemicals. Each of these methods exhibit certain advantages and disadvantages. Yet none are known to Appllicant to have the ability to be easily assembled with a first magnitude of torque and then require a second torque of several multiples of magnitude greater to disassemble, wherein the apparatus is usable immediately after assembly and is reusable a large number of times. Such a torque biased locking device is advantageous in many useful applications.

Various prior art references have suggested methods which take advantage of a looped spring's ability to change diameter. For example in U.S. Pat. Nos. 2,846,240 and 3,532,101 a coiled spring looped back on itself forming a closed ring is used as a detent in a concentrically sleeved non-threaded coupling thus forming an essentially snap together and quick-release connection. Similarly in U.S. Pat. No. 2,848,135 a spring snaps through a series of semi-circular grooved threads on the inner member of the coupling unit. Other devices that are similar to these, in that the looped spring makes a transition in diameter during assembly and disassembly, are known, such as in the pipe coupling of U.S. Pat. No. 2,921,801, as in the grip elements in the quick-release coupling of U.S. Pat. Nos. 2,922,665 and 2,939,728, in the well tool locking device of U.S. Pat. No. 3,250,331, and in the inflatable clamping means of U.S. Pat. No. 3,420,554.

In U.S. Pat. No. 1,814,478 a connector fitting is disclosed employing a spring filled with a deformable material. The filled spring is wrapped around a threadless conduit and acts as a gripping device and seal for coupling the threadless conduit to a conduit fitting. In U.S. Pat. No. 3,218,095 a sealing ring having an internal spring is employed in a tube coupling. In U.S. Pat. No. 1,882,520 a spiral spring is used for locking two concentric non-threaded pieces of a reciprocating pneumatic tool by providing an internal annulus with external opening through which the spring is inserted and removed each time the apparatus is to be disassembled. In U.S. Pat. No. 3,065,005 a casing stop collar is disclosed that utilizes a spring in a similar manner. And in U.S. Pat. No. 3,712,647 various combinations of spring structures with deformable seals are combined in a compression pipe connection.

Springs have also been used in threaded couplings for other purposes. For example, in U.S. Pat. No. 3,104,583 a flexing resilient threaded closure is disclosed wherein a spring is installed in a semi-circular helical groove and thus serves as one of the threaded surfaces. Such a closure is useful in autoclave vessels to better distribute stress associated with high temperature, high pressure cyclic operations. But none of the suggested uses of the looped helical spring can be categorized as being a biased locking means requiring greater torque to disassemble than for assembly.

SUMMARY OF THE INVENTION

In view of the above, I have discovered an improved threaded joint comprising:

(a) a pair of threaded members adapted to thread together;

(b) a circumferential confining member adapted to create an annular cavity as the pair of threaded members are assembled; and (c) latching means, adapted to fit within said annular cavity, that requires the application of a torque to disassemble the threaded joint that is in excess of the torque required to assemble the threaded joint.

The method associated with the invention for holding a threaded joint together comprises:

(a) providing an annular cavity between the pair of threaded members adapted to thread together;

(b) placing within said annular cavity a means that requires the application of a torque to disassemble the threaded joint that is in excess of the torque required to assemble the threaded joint; and (c) tightening said threaded joint such as to engage said means within said annular cavity.

The instant invention provides that the circumferential confining members may be attached to one of said pair of threaded members and that the means, adapted to fit within the annular cavity, that requires the application of a biased torque assembly/disassembly, may be a helical spring looped back on itself with ends interconnected. It is further provided that this biasing torque means be a closed loop of interconnected essentially circular disc elements.

It is an object of the invention to provide an inexpensive device that will securely hold two threaded members together. It is a further object to provide a holding device that requires greater force and torque to disassemble than is required to assemble the threaded members. It is an additional object that the device be capable of repeated assembly and disassembly. And, it is an object that the device be compatible with well drill string applications thus allowing the use of an acme thread on a drill string pipe. Fulfillment of these objects and the presence and fulfillment of further objects will be readily apparent upon complete reading of the specification and claims taken in conjunction with the attached drawing.

DESCRIPTION OF THE PREFERRED EMBODIMENT

Figure 2:
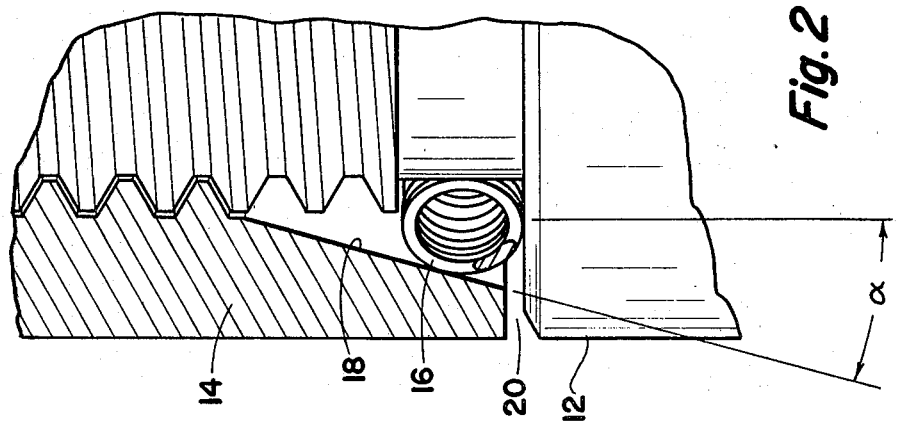
FIG. 2 is a cut-away side view of a portion of a closed or tightened coupling of FIG. 1.
Figure 1:
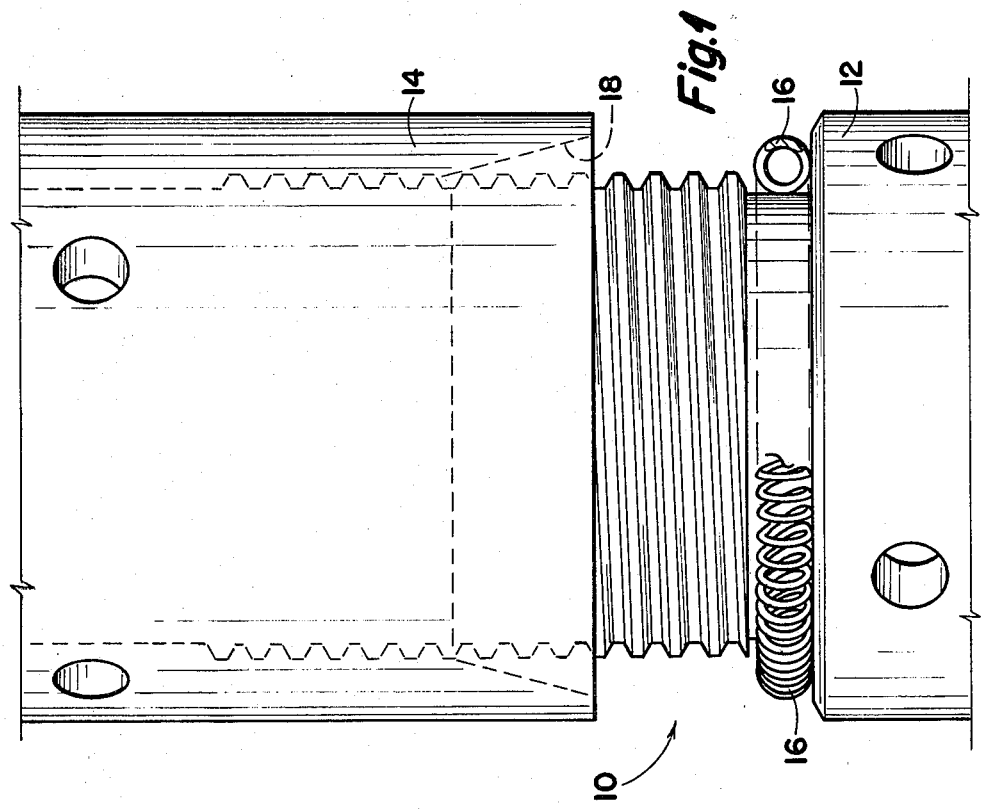
FIG. 1 is a side view of a coupling according to the instant invention prior to tightening.

The resilient holding device and associated method of the instant invention can perhaps be best explained and understood by reference to the accompanying drawing. FIG. 1 illustrates a side view of the threaded pipe joint, generally designated by the numeral 10, involving an acme threaded member 12 about to be threaded into member 14 with the coiled, uninterrupted garter spring 16 positioned in the joint. As the two members 12 and 14 are threaded together the beveled undercut 18 at the entrance of member 14 engages spring 16 and circumferentially confines spring 16 to an annular cavity formed at the joint. This can be seen more explicitly in FIG. 2 wherein the cross-section of the spring 16 is illustrated as being confined to the annular cavity 20 when the threaded joint is tightened sufficiently to engage spring 16. As the tightening process takes place threaded female member 14 makes contact with the spring 16 located on male threaded member 12 at the beveled undercut surface 18 at a relatively small angle.

Figure 3:
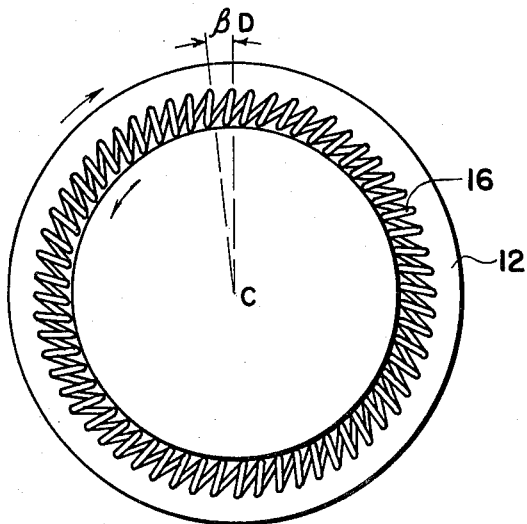
FIG. 3 illustrates a cross-section of a closed or tightened coupling of FIG. 1 less the female threaded member.

As tension is applied by tightening the joint the gradual pressure build up on the spring 16 creates substantial friction at the points of contact of spring 16 and threaded members 12 and 14. The tightening process involves rotation members 12 and 14 in opposite directions as illustrated in FIG. 3, producing substantial friction which causes displacement of each loop or coil of spring 16. Initially each loop or coil was essentially radial, such as line C/D, but during tightening the coils are displaced through an angle $\beta$ in a direction which conincides with the relative motion of members 12 and 14. This displacement or deflection of each coil of the spring creates a latching effect causing the break-away force for disassembling to exceed the tightening force.

Figure 4:
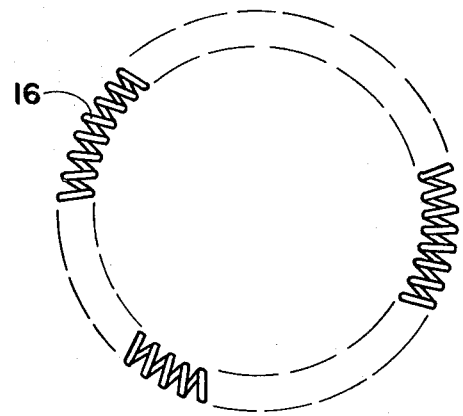
FIG. 4 is a closed loop garter spring as employed in FIG. 1.
Figure 5:
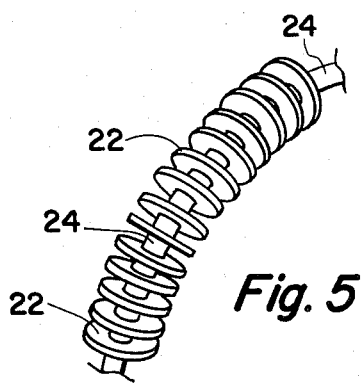
FIGS. 5 and 6 illustrate alternatives to the spring of FIG. 4.
Figure 6:
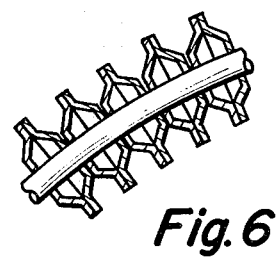

Various alternatives to the garter spring can be employed to create the biased torque for assembly/disassembly. Any series of closely spaced essentially circular disc elements interconnected such as to form a loop is operative. For example, FIGS. 5 and 6 illustrate alternate embodiments relative to the spring of FIG. 4. FIG. 5 is a series of conventional flat washers 22 threading onto a circular looped central member 24 appropriately sized and made from a variety of materials including, but not limited to, plastics, metals and elastomeric compositions. Similarly, FIG. 7 illustrates a series of alternating bellville washers on a support member. In principle, other geometric cross-sections of the closely spaced elements compatible with the geometry of the annular spaced developed during tightening should be considered equivalent to the illustrated embodiments.

The circumferential confining member is preferably an undercut beveled surface attached to the threaded female member. But it can alternately be attached to either threaded member or it can be a separate member. In the latter case the separate confining member can be either a rigid external confining ring structure or it can be a rigid (support) confining member.

To test the instant invention, an approximately 4 inch diameter drill pipe coupling as illustrated in the drawing was manufactured using acme threads. A ¼ inch diameter garter spring was selected as a torque biased locking means. It was found that mild hand tightening would invariably require a several fold greater reverse torque to disassemble. Upon repeated assembly and disassembly no deterioration of the basic operating characteristics was observed. It was further observed that the device could be hand tightened to a point where wrenches were necessary to disassemble yet further hand tightening was easily performed.

Having thus described the preferred embodiments with a certain degree of particularity, it is manifest that many changes can be made in the details of construction, arrangement and fabrication of the elements and their uses without departing from the spirit and scope of the invention. Therefore, it is to be understood that the invention is not limited to the embodiment set forth herein for purposes of exemplification, but is to be limited only by the scope of the attached claims, including a full range of equivalents to which each element thereof is entitled.

I claim:

1. A threaded joint comprising:
   (a) a pair of threaded members that thread together;
   (b) a circumferential confining member that creates an annular cavity as said pair of threaded members are assembled; and
   (c) a latching means, that fits within said annular cavity, that requires the application of a torque to disassemble said threaded joint that is in excess of the torque required to assemble said joint.

2. A threaded joint of claim 1 wherein said circumferential confining member is attached to one of said pair of threaded members.

3. A threaded joint of claim 2 wherein said circumferential confining member is attached to the female threaded member of said pair of threaded members.

4. A threaded joint of claim 2 or 3 wherein said circumferential confining member is internally beveled.

5. A threaded joint of claim 1, 2 or 3 wherein said latching means, which fits within said annular cavity, that requires the application of a torque to disassemble said threaded joint that is in excess of the torque required to assemble said threaded joint, is a helical spring looped back on itself with ends interconnected.

6. A threaded joint of claim 1, 2 or 3 wherein said latching means, that fits within said annular cavity, that requires the application of a torque to disassemble said threaded joint that is in excess of the torque required to assemble said threaded joint, is a closed loop of interconnected essentially circular disc elements.

* * * * *